United States Patent
Patapoutian (10) Patent No.: US 9,030,769 B2
(45) Date of Patent: May 12, 2015

(54) DATA DETECTION IN ADJACENT TRACKS

(71) Applicant: Seagate Technology LLC, Cupertino, CA (US)

(72) Inventor: Ara Patapoutian, Hopkinton, MA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/834,334

(22) Filed: Mar. 15, 2013

(65) Prior Publication Data

US 2014/0268392 A1    Sep. 18, 2014

(51) Int. Cl.
  *G11B 27/36*    (2006.01)
  *G11B 20/10*    (2006.01)
  *G11B 20/12*    (2006.01)

(52) U.S. Cl.
  CPC .... *G11B 20/10268* (2013.01); *G11B 20/10009* (2013.01); *G11B 27/36* (2013.01); *G11B 2020/1298* (2013.01)

(58) Field of Classification Search
  None
  See application file for complete search history.

(56) References Cited

U.S. PATENT DOCUMENTS

| | | | | |
|---|---|---|---|---|
| 5,657,176 | A * | 8/1997 | Moribe et al. | 360/31 |
| 6,909,566 | B1 * | 6/2005 | Zaitsu et al. | 360/31 |
| 7,126,890 | B2 * | 10/2006 | Learned et al. | 369/44.32 |
| 7,538,967 | B1 * | 5/2009 | Yang et al. | 360/77.07 |
| 8,094,396 | B1 * | 1/2012 | Zhang et al. | 360/31 |
| 8,130,553 | B2 * | 3/2012 | Buch et al. | 365/185.24 |
| 8,300,339 | B1 | 10/2012 | Nangare | |
| 8,543,894 | B1 * | 9/2013 | Varnica et al. | 714/794 |
| 8,885,275 | B1 * | 11/2014 | Lou et al. | 360/31 |
| 2002/0128787 | A1 * | 9/2002 | Seng et al. | 702/69 |
| 2003/0016461 | A1 * | 1/2003 | Seng et al. | 360/25 |
| 2006/0209443 | A1 * | 9/2006 | Yamazaki | 360/31 |
| 2006/0256670 | A1 * | 11/2006 | Park et al. | 369/43 |
| 2010/0157749 | A1 * | 6/2010 | Ogawa et al. | 369/44.11 |
| 2010/0290151 | A1 * | 11/2010 | Kondo et al. | 360/71 |
| 2011/0169615 | A1 * | 7/2011 | Donato | 340/10.5 |
| 2012/0105994 | A1 * | 5/2012 | Bellorado et al. | 360/45 |
| 2013/0021689 | A1 | 1/2013 | Haratsch | |

OTHER PUBLICATIONS

Sann et al., "Channel Models and Detectors for Two-Dimensional Magnetic Recording (TDMR)," Mar. 2010, 8 pgs.
Williams, Grant, "Read-Back Schemes for Two-Dimensional Magnetic Recording," Carroll College, Department of Mathematics, Engineering and Computer Science, *Thesis*, Mar. 30, 2012, 99 pgs.

* cited by examiner

*Primary Examiner* — Dismery Mercedes
(74) *Attorney, Agent, or Firm* — Mueting, Raasch & Gebhardt, P.A.

(57) ABSTRACT

Devices and/or methods may detect data located in adjacent tracks. A signal representative of a first data unit having a higher signal-to-noise ratio may be detected prior to a signal representative of a second data unit having a lower signal-to-noise ratio, and then may be used to improve the signal representative of the second data unit.

20 Claims, 4 Drawing Sheets

DATA DETECTION IN ADJACENT TRACKS

The disclosure herein relates to detecting data located in adjacent data tracks, and further to devices for performing and implementing such detecting.

SUMMARY

One exemplary device (e.g., a data device for use in two-dimensional magnetic recording systems, shingled magnetic recording systems, bit-patterned media systems, heat-assisted magnetic recording systems, thermally assisted magnetic recording systems, energy assisted magnetic recording, solid state storage systems, flash storage systems, etc.) may include a storage medium and a processor operably coupled to the storage medium.

The storage medium may include a plurality of data tracks. Each data track of the plurality of data tracks may extend next to, or along side, of each other. The processor may be configured to acquire a first read data signal representing a first data unit from a first data track and acquire a second read data signal representing a second data unit from a second track. The first data unit may be adjacent the second data unit. The processor may be further configured to generate a signal-to-noise ratio for each of the read data signals, detect the read data signal having the highest signal-to-noise ratio resulting in a first detected data signal, regenerate the read data signal having the lowest signal-to-noise ratio based on the first detected data signal resulting in an improved data signal, and detect the improved data signal resulting in a second detected data signal.

Another exemplary device may include a storage medium and a processor operably coupled to the storage medium. The storage medium may include a plurality of data tracks. Each data track of the plurality of data tracks may extend next to, or along side, of each other. The processor may be configured acquire a plurality of read data signals representing a plurality of data units. Each data unit of the plurality of data units may be from a different data track and may be located adjacent another data unit of the plurality of data units. The processor may be further configured to generate a signal-to-noise ratio for each of the plurality of read data signals, detect at least one read data signal having a signal-to-noise ratio greater than or equal to at least one read data signal resulting in at least one detected data signal, regenerate at least one read data signal having a signal-to-noise ratio lower than or equal to at least one read data signal resulting in at least one improved data signal, and detect the at least one improved data signal resulting in at least one improved detected data signal.

One exemplary method may include acquiring a first read data signal representing a first read data unit from a first data track and acquiring a second data signal representing a second data unit from a second track. The first data unit may be adjacent the second data unit. The method may further include generating a signal-to-noise ratio for each of the read data signals, detecting the read data signal having the highest signal-to-noise ratio resulting in a first detected data signal, regenerating the read data signal having the lowest signal-to-noise ratio based on the first detected data signal resulting in an improved data signal, and detecting the improved data signal resulting in a second detected data signal.

Another exemplary method may include acquiring a plurality of read data signals representing a plurality of data units. Each data unit of the plurality of data units may be from a different data track and may be located adjacent another data unit of the plurality of data units. The method may further include generating a signal-to-noise ratio for each of the plurality of read data signals, detecting at least one read data signal having a signal-to-noise ratio greater than or equal to at least one read data signal resulting in at least one detected data signal, regenerating at least one read data signal having a signal-to-noise ratio lower than or equal to at least one data signal resulting in at least one improved data signal, and detecting the at least one improved read data signal resulting in at least one improved detected data signal.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

When data is requested by a host from a storage device such as a hard drive, the required data may be read or sensed, e.g., using a reader or head scanning a storage medium of the storage device, resulting in a data signal. The data may be detected based on the signal using one or more devices and processes.

As storage medium capacities have increased, data tracks located on such storage mediums have been located closer in proximity to each other, increasing storage density and capacity of storage media. As adjacent data tracks become closer, crosstalk (e.g., magnetic interference, etc.) between the adjacent tracks (e.g., known as inter-track interference), may become increasingly significant, such that data in a desired track cannot be read, leading to data corruption and other problems.

Interference from adjacent (or neighboring) tracks may occur during read operations, especially when a reader or head is employed that is not significantly narrower than the width of the data tracks. Also, when the reader is not precisely centered over the desired track to be read, additional interference from adjacent data tracks may be read. For example, a reader might receive signals from one or more adjacent (or neighboring) tracks, in addition to the signal from the desired track to be read.

Two-dimensional magnetic recording, or TDMR, is a technology can improve areal density and/or performance. In TDMR, two or more tracks may be detected simultaneously (e.g., using two or more heads) or used jointly for detection. In general, the detection costs, however, may be extremely high. For example, if a single track needs a 16 state detection, then 256 states (e.g., 16×16 states) may be required (e.g., due to interference, etc.) to be used to detect two tracks simultaneously, which may result in higher overhead, slower detection, and higher detection costs In general, different data units, or segments, on different tracks maybe associated with different signal-to-noise ratios (SNR), some having a higher SNR and some having a lower SNR. The exemplary devices and methods described herein may take advantage varying SNRs. For example, an exemplary detector may identify a data signal representative of unit, or data segment, with a higher SNR, detect the data unit of the higher SNR signal, and then, improve (e.g., using interference cancellation or removal, signal boosting or addition, etc.) a data signal representative of an adjacent data unit (e.g., located at least partially adjacent to the data unit with the higher SNR) prior to detecting the adjacent data unit. In other words, signals from two adjacent data units may be acquired, the data unit having the signal with a higher SNR may be detected first, and then the signal for the other data unit may be improved, boosted, and/or regenerated based on the first detected data signal. Additionally, the exemplary devices and methods described herein may apply the same processes and techniques to more than two adjacent data units.

Figure 1:
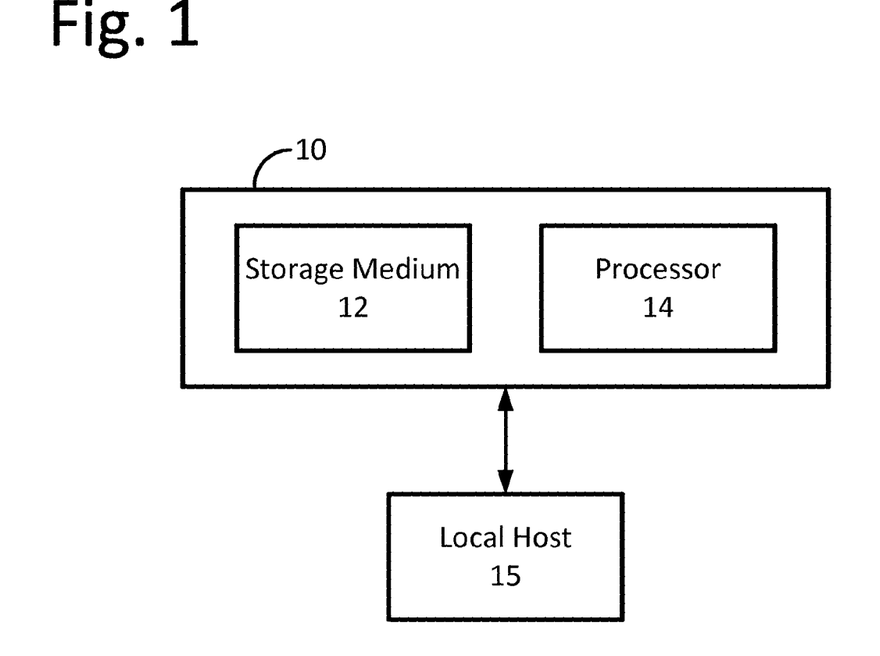
FIG. 1 is block diagram including an exemplary device for use in detecting data.

An exemplary device 10 (e.g., data device) that can be used in the embodiments described herein is depicted in FIG. 1. The exemplary device 10 may be operably coupled to a local host 15, e.g., for transferring data therebetween, as shown in FIG. 1. For example, the local host 15 may request data from the device 10 and the device 10 may provide such requested data to the local host 15. In at least one embodiment, the local host 15 is a computer (such as, e.g., a personal computer, server, etc.). The device 10 includes a storage medium 12, a buffer (e.g., for storing data during read and write operations), and a processor, or processing apparatus, 14 that are operably coupled (e.g., electrically coupled to transmit data therebetween) to each other. The methods and devices disclosed herein may be generally described in the context of exemplary device 10 and/or systems including exemplary device 10, but that should in no way be taken as limiting the scope of the present disclosure. Generally, a device 10 may be any device and/or apparatus in which data may be written to the storage medium 12 and then read back from the storage medium 12.

Figure 2:
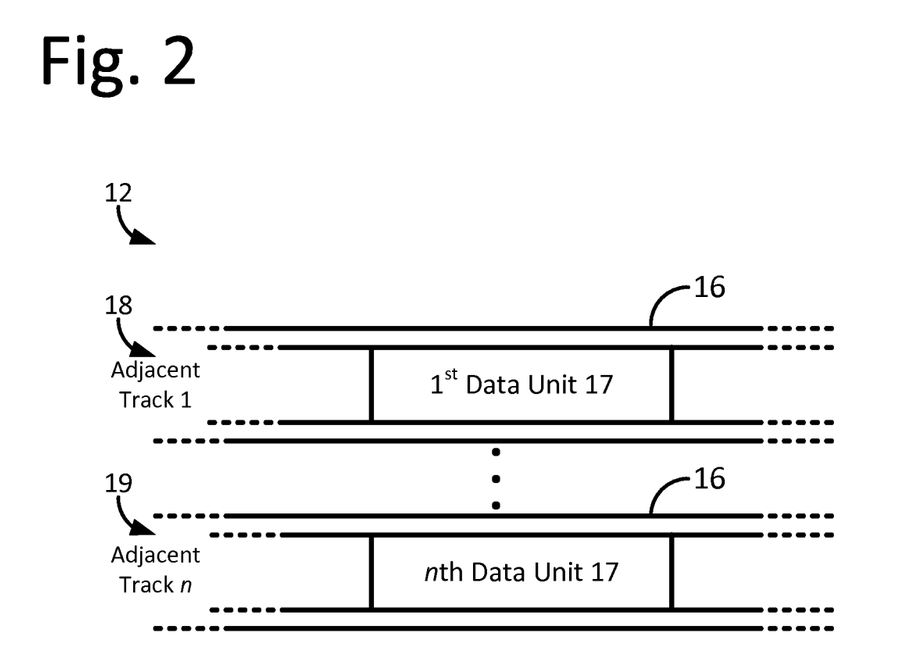
FIG. 2 is a diagram of a portion of an exemplary storage medium, e.g., from which data may be detected by the exemplary devices and methods described herein such as the device of FIG. 1 and the methods of FIGS. 3-4.

An exemplary storage medium 12 as shown in FIG. 2 may be any device and/or apparatus configured to store a plurality of data tracks, or tracks of data, 16 (e.g., binary data, etc.). Each data track 16 may contain a plurality of data units, or sectors of data, 17. The storage medium 12 can include, but is not necessarily limited to, solid state memory, hard magnetic discs, magnetic tapes, optical discs, integrated circuits, volatile memory, nonvolatile memory, etc. Generally, the plurality of data tracks 16 may be contained in non-volatile memory.

Non-volatile memory may include any kind of computer memory that can retain information stored thereon when not powered. Examples of non-volatile memory may include, but are not limited to, hard drives, solid state drives, read only memory (ROM), flash memory, and random access memory (RAM). Examples of ROM include, but are not limited to, programmable ROM (PROM) which can also be referred to as field programmable ROM; electrically erasable programmable ROM (EEPROM) which is also referred to as electrically alterable ROM (EAROM); and erasable programmable ROM (EPROM). Examples of RAM include, but are not limited to, ferroelectric RAM (FeRAM or FRAM); magnetoresistive RAM (MRAM); resistive RAM (RRAM); non-volatile static RAM (nvSRAM); battery backed static RAM (BBSRAM); phase change memory (PCM) which is also referred to as PRAM, PCRAM and C-RAM; programmable metallization cell (PMC) which is also referred to as conductive-bridging RAM or CBRAM; nano-RAM (NRAM), spin torque transfer RAM (STTRAM) which is also referred to as STRAM; and Silicon-Oxide-Nitride-Oxide-Silicon (SONOS), which is similar to flash RAM.

Each data track, or track of data, 16 of the plurality of data tracks 16 of the storage medium 12 may be generally described as including a plurality of data units 17 (e.g., sectors of data, pages of data, cells of data, etc.). For example, each data track 16 may be subdivided in a plurality of data units 17. As defined herein, each data unit 17 may be defined as the basic unit of data storage on the storage medium 12. In at least one embodiment, for example, in connection with a magnetic disc, a data unit 17 may be referred to as a "sector."

Each data unit 17 in a data track 16 may include one or more bits or bytes. In at least one embodiment, each data unit 17 in a data track 16 contains 4096 bytes of data. In at least one embodiment, each data unit 17 in a data track 16 contains 512 bytes of data. In at least one embodiment, each data unit 17 in a data track 16 contains a single bit of data. In at least one embodiment, a data unit 16 can be contained in a plurality of memory cells. The number of data units 17 within a data track 16 may depend at least in part on the size of the data track 16.

In at least one embodiment, the storage medium 12 may include one or more magnetic discs. Each disc in an exemplary storage medium 12 may include a surface having a plurality of substantially concentric circular data tracks 16. Each of the concentric circular data tracks 16 may be adjacent to other data tracks: one data track to the inside and one data track to the outside. In at least one embodiment, the storage medium 12 may be a solid state drive. The solid state drive may include a plurality of data tracks 16, and each of the data tracks 16 may be adjacent to other data tracks (e.g., physically located in proximity to another track, which may cause capacitance interference between data units). As used herein, adjacent data tracks may be defined as data tracks that are next to each other. In at least one embodiment, adjacent tracks may be tracks that are immediately next to each other (e.g., with no other tracks therebetween).

The data tracks 16 (e.g., such as on a magnetic disc-based storage medium or solid state storage medium) are logically divided into a plurality of data units 17. Each data unit, or storage sector, 17 may be identified and located at various positions on magnetic disc. In the magnetic disc-type storage medium, the data units, or sectors, 17 may be pie-wedge shaped angular sections of a track that are bounded on two sides by radii of the disc and on the other side by the perimeter of the circle that defines the track.

As used herein, adjacent data units may be defined as data units that are located in adjacent data tracks and also at least partially located in the same respective portion of their track (e.g., in the same pie-wedge shaped angular section). In at least one embodiment, adjacent data units may be in data tracks that are immediately next to each other (e.g., with no other data tracks therebetween).

The processor 14 may include various circuitry, logic, memory, etc. for use in the detecting and writing data from the storage medium 12 and/or managing data within a buffer. For example, the processor 14 may include one or more circuit components such as integrated circuits, processors, etc. that may be configured to interface with the storage medium 12 and a buffer to detect, write, and decode data therebetween. Among other things, the processor 14 may be configured to detect two or more adjacent data units 17 read from the storage medium 12 using information obtained from one another and/or simultaneously.

For example, as shown in FIG. 2, a first data unit 17 may be located in a first adjacent track 18 and n-th data unit 17 may be located in an n-th adjacent track 19. Each data unit 17 may be detected simultaneously. More specifically, a signal representative of each of the data units 17 may be acquired from each track 16 from the storage medium 12. Since the first data unit 17 and the n-th data unit 17 are adjacent, the signals representative of the first data unit 17 and the n-th data unit 17 may include components from each other. In other words, the signals representative of the first data unit 17 and the n-th data unit 17 may overlap because the first data unit 17 and the n-th data unit 17 are physically adjacent (e.g., located in physical adjacent tracks, located in the same portions of the physically adjacent tracks, etc.) on the storage medium 12.

Generally, two adjacent data units 17 may be described by the following signal equations:

$$z_1 = \alpha y_1 + (1-\alpha) y_2 + n_1 \quad (1)$$

$$z_2 = (1-\beta) y_1 + \beta y_2 + n_2 \quad (2)$$

where $z_1$ represents a read signal representing a first data unit acquired by a reader (e.g., a head), $z_2$ represents a read signal representing a second data unit acquired by a reader (e.g., a head) adjacent to the first data unit, $y_1$ represents the first ideal data signal, $y_2$ represents the second ideal data signal, $\alpha$ represents a scaling factor representative of the location of the first data unit relative to the reader when the read signal representing the first data unit is acquired from the storage medium (e.g., a value of 1 may be ideal), $\beta$ represents a scaling factor representative of the location of the second data unit relative to the reader when the read signal representing the second data unit is acquired from the storage medium (e.g., a value of 1 may be ideal), and $n_1$ and $n_2$ represent the noise for the first and second ideal signals, respectively. As used herein, an "ideal" data signal may be defined as a data signal that perfectly corresponds to the data unit it represents. In other words, the ideal data signal is a perfect signal, or waveform, representation of the data unit.

If one of the first and second ideal data signals, $y_1$, $y_2$ is known (detected and regenerated using conventional detectors or detection such as, e.g., a Viterbi detector, a maximum a posteriori (MAP) detector, a BCJR detector, a soft-output Viterbi algorithm (SOVA) detector, etc.), then the known data signal may be removed from one or both of the signal equations, which may also be known as interference cancellation or removal. For example, if $y_1$, $\alpha$, and $\beta$ are known, the signal equations may be written as $$z_1 = (1-\alpha) y_2 + n_1 \quad (3)$$

$$z_2 = \beta y_2 + n_2 \quad (4).$$

In other words, the first ideal signal, $y_1$, has been removed from each of the read data signals $z_1$, $z_2$. Thus, using either of Equations (3)-(4), the second ideal signal may be generated (and improved since the interference from the first ideal signal, $y_1$, has been removed). Generally, however, since $\beta$ is probably much greater than $1-\alpha$, Equation (4) may provide a stronger signal to be used to generated, or regenerate, the second ideal signal, $y_2$.

Each signal, however, may contain additional useful information with respect to the unknown signal, and as such, may be used to boost the unknown signal. As such, the signal equations may be written as follows:

$$z_1' = y_2 + \frac{n_1}{(1-\alpha)} \quad (5)$$

$$z_2' = y_2 + \frac{n_2}{\beta}. \quad (6)$$

A signal, z, representing a weighted, improved data signal representative of the unknown data unit, $y_2$, plus noise, n, may be regenerated using both Equations (5), (6) as represented by $$z = \frac{\sigma_2^2}{\sigma_1^2 + \sigma_2^2} z_1' + \frac{\sigma_1^2}{\sigma_1^2 + \sigma_2^2} z_2' \quad (7)$$

$$= y_2 + n \quad (8)$$

where $\sigma_1$ represents the standard deviation of $$\frac{n_1}{(1-\alpha)}$$

from Equation (5) and $\sigma_2$ represents the standard deviation of $$\frac{n_2}{\beta}$$

from Equation (6). The coefficients in front of $z_1'$ and $z_2'$ in Equation (7) provide ratios, or weights, to each signal portion, $z_1'$, $z_2'$, such that $\sigma_1 < \sigma_2$ results in weighting $z_1'$ with a larger weight than $z_2'$ and vice versa. After the signal, z, representative of the unknown data signal, $y_2$, plus noise n, has been regenerated, the unknown data signal, $y_2$, may be detected using conventional detecting or detection (e.g., a Viterbi detector, a maximum a posteriori (MAP) detector, a BCJR detector, a soft-output Viterbi algorithm (SOVA) detector, etc.).

In essence, Equations (1)-(4) may be used to describe the removal of the known signal from the unknown signal (e.g., through interference cancellation) to improve the unknown signal, and Equations (5)-(8) may be used to describe the addition of components of the unknown signal from the other read signal (containing the known signal) to improve the unknown signal.

The methods, techniques, and/or processes described in this disclosure, including those attributed to the processor, or various constituent components, may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processing apparatus," "processor," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, STRAM, RRAM, magnetic data storage media, optical data storage media, or the like. The instructions may be executed by one or more processors to support one or more aspects of the functionality described in this disclosure.

Figure 3:
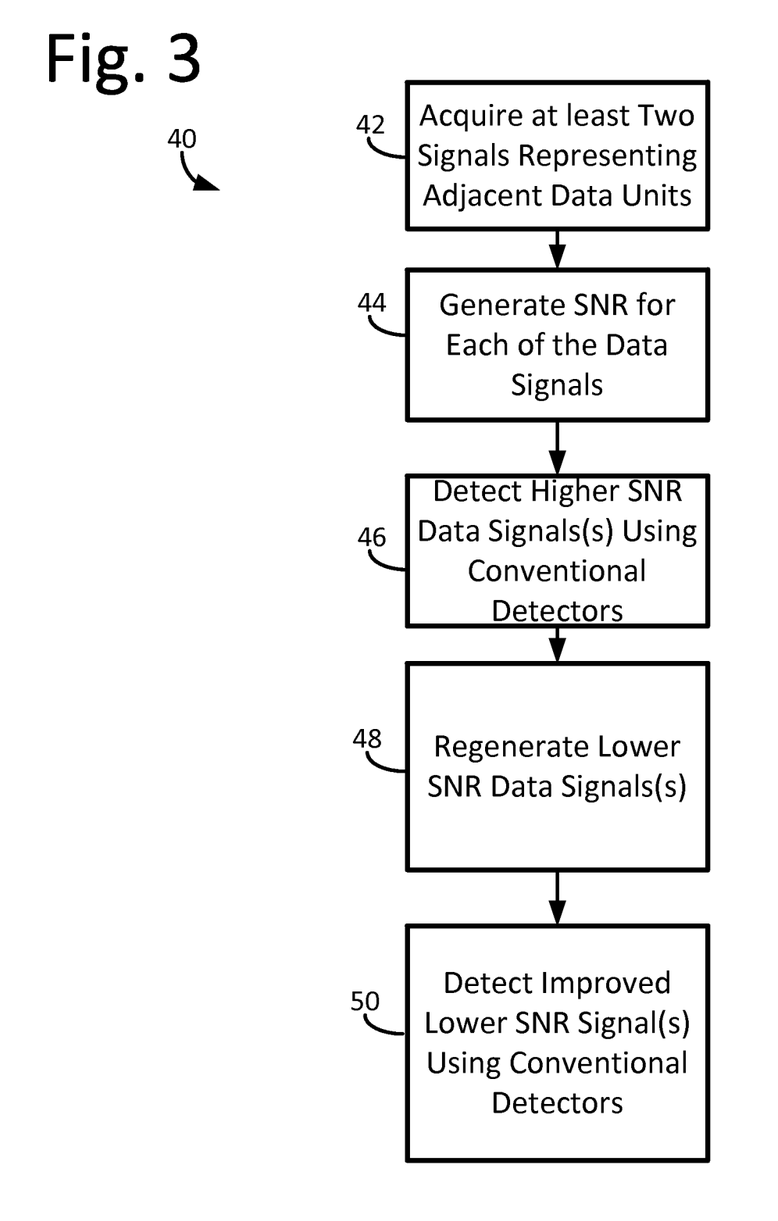
FIG. 3 is a flow diagram of an exemplary method of detecting data from a storage medium.

An exemplary detection method 40 is depicted in FIG. 3. The method 40 may acquire at least two signals, each representing an adjacent data unit, using a reader (e.g., a head) from a storage medium 42. In other words, at least two adjacent data units may be read, or sensed, resulting in at least two data signals. Each of the data signals read may be referred to as "read data signals." Each data unit may be described as being adjacent, which means that the data units that are located in adjacent data tracks and also at least partially located in the same respective portion of their track (e.g., in the same pie-wedge shaped angular section).

The at least two read data signals may be acquired simultaneously, e.g., using multiple readers or heads. In other words, at least two adjacent data units may be read, or sensed, simultaneously resulting in at least two read data signals. In at least one embodiment, two or more read data signals being acquired simultaneously may be defined as two signals being acquired during the same revolution of a rotational magnetic disc-based drive. In at least one embodiment, two read data signals may be acquired from two data tracks simultaneously. In at least one embodiment, three read data signals may be acquired from three data tracks simultaneously. In at least one embodiment, four or more read data signals may be acquired from four or more data tracks simultaneously.

The at least two rad data signals may also be acquired sequentially, e.g., using a single reader or head. In other words, at least two adjacent data units may be read, or sensed, sequentially resulting in at least two read data signals. In at least one embodiment, two or more read data signals being acquired sequentially may be defined as each read data signal being acquired during a different revolution of a rotational magnetic disc-based drive. In at least one embodiment, two or more read data signals being acquired sequentially may be acquired in back-to-back revolutions.

A signal-to-noise ratio (SNR) may be generated for each of the read data signals 44. Although in this embodiment, a SNR is generated for each of the read data signals 44 to indicate which read data signals have higher quality than one or more other data signals, other metrics or tests for quality may be used such as, e.g., minimum mean square error estimation, noise variance estimation from a preliminary detector, projection of noise statistics on direction of minimum distance, etc. A signal having high quality may indicate a signal having a higher likelihood of decoding success (e.g., using an ECC decoder), a higher likelihood of expedient decoding (e.g., using an ECC decoder), a higher likelihood of having less bit errors, etc. than a signal having a lower quality.

Although the term "quality" is used to describe data units, the term "stressed" may also be used when describing data units. For example, a data unit that may be more difficult or time consuming to detect and decode (e.g., using an ECC decoder) may be more stressed (e.g., have lower quality) than that of a data unit that may be less difficult or less time consuming to detect and decode. Additionally, the terms "stronger" and "weaker" may be used to describe the read data signals whereas stronger read data signals may have higher quality while the weaker read data signal may have lower quality. Regardless of the terms used to describe the read data signals, the two or more read data signals representing two or more adjacent data units may be analyzed and classified based on likelihood of decoding success, likelihood of expedient decoding, likelihood of having few or less bit errors, etc.

One or more read data signals having a higher SNR may be detected 46 using one or more conventional detectors (e.g., a Viterbi detector, a maximum a posteriori (MAP) detector, a BCJR detector, a soft-output Viterbi algorithm (SOVA) detector, etc.), and their respective data units may be decoded, e.g., using an ECC decoder and delivered to the local host, etc. In an embodiment where two read data signals representing two adjacent data units have been acquired 42, the read data signal having the higher SNR may be detected 46.

In an embodiment where three or more read data signals representing three or more adjacent data units have been acquired 42, one or more read data signals having a higher SNR than at least one read data signal may be detected 46. For example, the read signal having the highest SNR of the three or more read data signals may be detected using conventional detectors 46 or two read data signals having a higher SNR than at least one read data signal may be detected using conventional detectors 46. In other words, in the exemplary method 40, only one read signal read signals to all but one of the read data signals may be detected by conventional detectors 46.

To determine which read data signals to detect based on SNR or another metric, a selected value (in other words, a threshold value) may be utilized and compared to the generated, or computed, SNR for each of the read data signals. For example, a SNR may be generated for each of the read data signals 44 and the SNR for each of the read data signals may be compared to the selected value. The signals having a SNR greater than the selected value may be detected with conventional detectors 46 while the read data signals having a SNR less than or equal to the selected value may be regenerated in the next process 48.

After one or more read data signals having a higher, or acceptable, SNR have been detected 46, the method 40 may regenerate the one or more signals having a lower, or unacceptable, SNR using one or more processes or techniques 48 using the detected data signals (detected from the higher SNR read data signals). In other words, the detected data signals may be used to improve the quality (e.g., strength, etc.) of the lower SNR read data signals. For example, interference cancellation processes or techniques such as adjacent track interference cancellation (ATIC) processes or techniques, e.g., such as those described herein with reference to Equations (3)-(4), may be used to improve the quality of the lower SNR data signals. Further, for example, signal boosting processes or techniques, e.g., such as those described herein with reference to Equation (7), may be used to improve the quality of the lower SNR data signals.

The regeneration (e.g., the improvement) of the one or more read data signals having a lower SNR 48 may result in one or more improved, regenerated signals (e.g., boosted signals, stronger signals, etc.) representing one or more data units, and the method 40 may then detect the improved, regenerated signals using conventional detectors or detection resulting in one or more detected data signals 50. Afterwards, the method 40 may deliver the remaining detected data signals to an ECC decoder and then to the local host.

Exemplary methods and devices described herein may also include detecting data units having a higher quality prior to data units having a lower quality because, e.g., the lower quality data units may fail during decoding using ECC decoders, the lower quality data units may take longer to decode using ECC decoders, and/or the lower quality data units may take more overhead and/or processing power, etc. to decode using ECC decoders than the higher quality data units.

Figure 4:
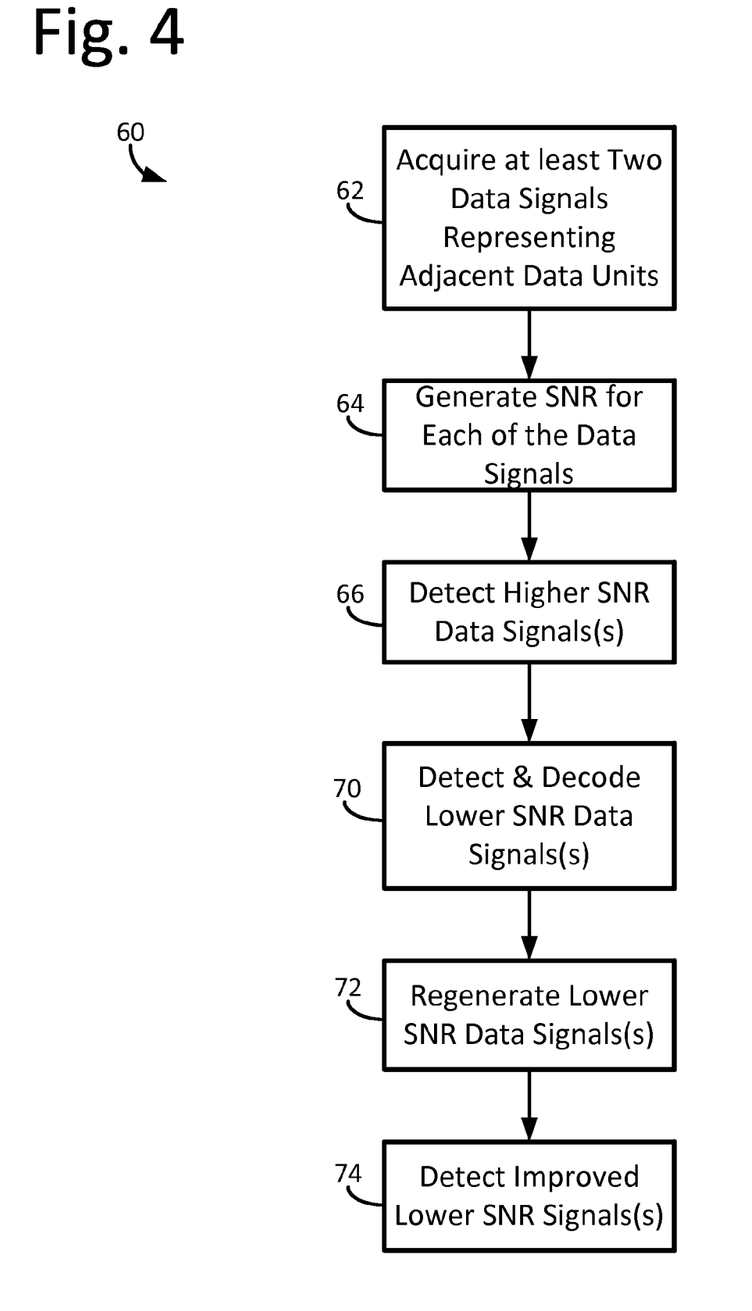
FIG. 4 is a flow diagram of another exemplary method of detecting data from a storage medium.

Exemplary method 60 includes acquiring at least two read data signals representing adjacent data units 62, generating a SNR for each of the read data signals 64, and detecting the higher SNR read data signals using conventional detectors 66, which are similar to the processes 42, 44, 46 of exemplary method 40 described herein with reference to FIG. 3, and as such, are not described in further detail herein. Generally, exemplary method 60 additionally includes attempting to detect and decode the lower SNR read data signals using conventional detectors and an ECC decoder 70 prior to any signal improvement processes occurring on the lower SNR read data signals. If the lower SNR read data signals cannot be detected and decoded, the exemplary method 60 may then regenerate the lower SNR read data signals to improve the signals. In other words, a lower SNR flag or ECC failure flag may be set for read data signals either having too lower of an SNR or that have failed ECC decoding, and such signals may be regenerated, or improved, using the techniques and processes described herein.

For example, if the lower SNR read data signal cannot be detected and decoded 70, the exemplary method 60 would indicate a data signal failure. Further, for example, if the ECC decoder being used is taking longer than a selected, or specified, time period to decode the lower SNR data signal, the exemplary method 60 would indicate a data signal failure. Still further, for example, if an ECC decoder has performed more than selected number of iterations to decode the lower SNR data signal, the exemplary method 60 would indicate a data signal failure.

If the exemplary method 60 indicates a failure for a lower SNR read data signal, the exemplary method 60 may proceed to regenerating, or improving, the lower SNR data signals, e.g., using interference cancellation and/or signal boosting, etc., resulting in improved, regenerated lower SNR data signals 72 and to detecting the improved, regenerated lower SNR data signals using conventional detectors resulting in the detected data signals 74, which is similar to regenerating the lower SNR data signal 50 and detecting the regenerated lower SNR data signals using conventional detectors 52 described herein with reference to FIG. 3. After the regenerated lower SNR data signals have been detected resulting in the detected data signals 74, the exemplary method 60 may decode the detected data signals and deliver them to the local host.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g., 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

Exemplary methods and devices were described herein with reference to FIGS. 1-4. It will be apparent to one skilled in the art that elements or processes from one embodiment may be used in combination with elements or processes of the other embodiments, and that the possible embodiments of such methods and devices using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

What is claimed is:

1. A device comprising:
    a storage medium comprising a plurality of data tracks, wherein each data track extends along side of each other; and
    a processor operably coupled to the storage medium and configured to:
        acquire a first read data signal representing a first data unit from a first data track;
        acquire a second read data signal representing a second data unit from a second track, wherein first data unit is adjacent the second data unit;
        generate a signal-to-noise ratio for each of the read data signals;
        detect the read data signal having the highest signal-to-noise ratio resulting in a first detected data signal;
        regenerate the read data signal having the lowest signal-to-noise ratio based on the first detected data signal resulting in an improved data signal; and
        detect the improved data signal resulting in a second detected data signal.

2. The device of claim 1, wherein regenerating the read data signal having the lowest signal-to-noise ratio based on the first detected data signal resulting in an improved data signal comprises at least one of:
    removing the first detected data signal from the read data signal having the lowest signal-to-noise ratio; and
    adding components of the read data signal having the highest signal-to-noise ratio to the read data signal having the lowest signal-to-noise ratio.

3. The device of claim 1, wherein the processor is further configured to only regenerate the read data signal having the lowest signal-to-noise ratio based on the first detected read data signal resulting in an improved data signal if decoding a detected data signal based on the read data signal having the lowest signal-to-noise ratio using an error correction code fails.

4. The device of claim 1, wherein detecting the read data signal having the highest signal-to-noise ratio resulting in a first detected data signal comprises detecting the read data signal using conventional detectors.

5. The device of claim 4, wherein the conventional detectors comprises at least one of a Viterbi detector, a maximum a posteriori (MAP) detector, a BCJR detector, and a soft-output Viterbi algorithm (SOVA) detector.

6. The device of claim 1, wherein the processor is further configured to:
acquire a third read data signal representing a third data unit from a third track, wherein the third data unit is adjacent one of the first data unit and the second data unit;
detect the read data signal having a middle signal-to-noise ratio resulting in a third detected data signal, wherein the middle signal-to-noise ratio is greater than the lowest signal-to-noise ratio and lower than the greatest signal to noise ratio; and
regenerate the read data signal having the lowest signal-to-noise ratio based on the first detected data signal and the third detected data signal resulting in the improved data signal.

7. The device of claim 1, wherein the processor is further configured to:
acquire a third read data signal representing a third data unit from a third track, wherein the third data unit is adjacent one of the first data unit and the second data unit;
regenerate the read data signal having a middle signal-to-noise ratio resulting in an additional improved data signal based on at least one of the first detected data signal and the second detected data signal, wherein the middle signal-to-noise ratio is greater than the lowest signal-to-noise ratio and lower than the greatest signal to noise ratio; and
detect the additional improved data signal resulting in a third detected data unit.

8. The device of claim 1, wherein acquiring the first read data signal and acquiring the second read data signal occur simultaneously.

9. A device comprising:
a storage medium comprising a plurality of data tracks, wherein each data track extends along side of each other; and
a processor operably coupled to the storage medium and configured to:
acquire a plurality of read data signals representing a plurality of data units, each of the plurality of data units from a different data track and located adjacent another data unit of the plurality of data units;
generate a signal-to-noise ratio for each of the plurality of read data signals;
detect at least one read data signal of the plurality of read data signals having a signal-to-noise ratio greater than or equal to a signal-to-noise ratio of at least another read data signal of the plurality of read data signals resulting in at least one detected data signal;
regenerate the at least one read data signal of the plurality of read data signals having a signal-to-noise ratio lower than or equal to a signal-to-noise ratio of at least another read data signal of the plurality of read data signals based on the at least one detected data signal resulting in at least one improved data signal; and
detect the at least one improved data signal resulting in at least one improved detected data signal.

10. The device of claim 9, wherein the processor is further configured to only regenerate the at least one read data signal of the plurality of read data signals having a signal-to-noise ratio lower than or equal to a signal-to-noise ratio of at least another read data signal of the plurality of read data signals if decoding a detected data signal based on the at least one read data signal having the lower signal-to-noise ratio using an error correction code fails.

11. The device of claim 9, wherein detecting the at least one read data signal of the plurality of read data signals comprises detecting the at least one read data signal using conventional detectors.

12. The device of claim 9, wherein at least two of the plurality of data signals are acquired simultaneously.

13. A method comprising:
acquiring a first read data signal representing a first data unit from a first data track;
acquiring a second read data signal representing a second data unit from a second track, wherein the first data unit is adjacent the second data unit;
generating a signal-to-noise ratio for each of the read data signals;
detecting the read data signal having the highest signal-to-noise ratio resulting in a first detected data signal;
regenerating the read data signal having the lowest signal-to-noise ratio based on the first detected data signal resulting in an improved data signal; and
detecting the improved data signal resulting in a second detected data signal.

14. The method of claim 13, wherein the method further comprises only regenerating the read data signal having the lowest signal-to-noise ratio based on the first detected data signal resulting in an improved data signal if the decoding a detected data signal based on the read data signal having the lowest signal-to-noise ratio using an error correction code fails.

15. The method of claim 13, wherein detecting the read data signal having the highest signal-to-noise ratio comprises detecting the read data signals using conventional detectors.

16. The method of claim 13, wherein acquiring the first read data signal and acquiring the second read data signal occur simultaneously.

17. A method comprising:
acquiring a plurality of read data signals representing a plurality of data units, each data unit of the plurality of data units from a different data track and located adjacent another data unit of the plurality of data units;
generating a signal-to-noise ratio for each of the plurality of read data signals;
detecting at least one read data signal of the plurality of read data signals having a signal-to-noise ratio greater than or equal to a signal-to-noise ratio of at least another read data signal of the plurality of read data signals resulting in at least one detected data signal;
regenerating at least one read data signal of the plurality of read data signals having a signal-to-noise ratio lower than or equal to a signal-to-noise ratio of at least another read data signal of the plurality of read data signals based on the at least one detected data signal resulting in at least one improved data signal; and detecting the at least one improved data signal resulting in at least one improved detected data signal.

18. The method of claim 17, wherein regenerating the at least one read data signal of the plurality of read data signals having a signal-to-noise ratio lower than or equal to a signal-to-noise ratio of at least another data signal of the plurality of read data signals only occurs if decoding at least one detected data signal based on the at least one read data signal having the lower signal-to-noise ratio using an error correction code fails.

19. The method of claim 17, wherein regenerating at least one read data signal of the plurality of read data signals having a signal-to-noise ratio lower than or equal to a signal-to-noise ratio of at least another read data signal based on the at least one detected data signal resulting in at least one improved data signal comprises at least one of:
   removing one or more of the at least one detected data signal from the at least one read data signal of the plurality of read data signals having a lower signal-to-noise ratio; and
   adding components of the at least one read data signal of the plurality of read data signals having a higher signal-to-noise ratio to the at least one read data signal of the plurality of read data signals having a lower signal-to-noise ratio.

20. The method of claim 17, wherein at least two of the plurality of read data signals are acquired simultaneously.

* * * * *